US011941367B2

(12) United States Patent
Lewis et al.

(10) Patent No.: US 11,941,367 B2
(45) Date of Patent: Mar. 26, 2024

(54) QUESTION GENERATION BY INTENT PREDICTION

(71) Applicant: International Business Machines Corporation, Armonk, NY (US)

(72) Inventors: Jacob Lewis, New York, NY (US); Ruchi Asthana, New York, NY (US); Jennifer A. Mallette, Vienna, VA (US); Steven Ware Jones, Astoria, NY (US)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 17/334,714

(22) Filed: May 29, 2021

(65) Prior Publication Data

US 2022/0382993 A1 Dec. 1, 2022

(51) Int. Cl.
| | |
|---|---|
| *G06F 40/35* | (2020.01) |
| *G06F 40/30* | (2020.01) |
| *G06F 40/40* | (2020.01) |
| *H04L 51/02* | (2022.01) |
| *G06F 40/216* | (2020.01) |
| *G06F 40/279* | (2020.01) |
| *G06N 3/044* | (2023.01) |
| *G06N 3/08* | (2023.01) |

(52) U.S. Cl.
CPC .............. *G06F 40/35* (2020.01); *G06F 40/30* (2020.01); *G06F 40/40* (2020.01); *H04L 51/02* (2013.01); *G06F 40/216* (2020.01); *G06F 40/279* (2020.01); *G06N 3/044* (2023.01); *G06N 3/08* (2013.01)

(58) Field of Classification Search
None
See application file for complete search history.

(56) References Cited

U.S. PATENT DOCUMENTS

| | | |
|---|---|---|
| 1,052,613 A | 2/1913 | Motznik |
| 8,793,238 B1 | 7/2014 | Carver |
| 9,092,801 B2 | 7/2015 | Chang |
| 9,647,968 B2 | 5/2017 | Smullen |
| 9,866,693 B2 | 1/2018 | Tamblyn |
| 10,171,662 B1 | 1/2019 | Zhou |
| 10,572,801 B2 | 2/2020 | Mars |
| 10,679,012 B1 * | 6/2020 | Salimov ................. G06N 3/088 |
| 10,798,030 B1 * | 10/2020 | Igure ....................... G06F 40/30 |

(Continued)

FOREIGN PATENT DOCUMENTS

| | | |
|---|---|---|
| CA | 2633458 C | 6/2006 |
| WO | 2015037815 A1 | 3/2015 |
| WO | 2019027992 A1 | 2/2019 |

OTHER PUBLICATIONS

Authors, Predicting User Intent in a Recently Changed Interface; Jan. 5, 2018 https://ip.com/IPCOM/000252360 (Year: 2018).*

(Continued)

*Primary Examiner* — Richa Sonifrank
(74) *Attorney, Agent, or Firm* — David K. Mattheis

(57) ABSTRACT

Generating questions by receiving user utterance data, determining an intent confidence vector for the user utterance data, predicting, by a trained next user-intent prediction model, a next user-intent confidence vector using the intent confidence vector, and generating a next question using the next user-intent confidence vector.

14 Claims, 7 Drawing Sheets

(56) References Cited

U.S. PATENT DOCUMENTS

| | | | |
|---|---|---|---|
| 10,832,003 | B2 | 11/2020 | Costello |
| 2009/0055368 | A1 | 2/2009 | Rewari |
| 2013/0080362 | A1 | 3/2013 | Chang |
| 2014/0031712 | A1 | 1/2014 | Herskovitz |
| 2014/0044243 | A1 | 2/2014 | Monegan |
| 2014/0317120 | A1 | 10/2014 | Ghose |
| 2016/0078456 | A1 | 3/2016 | Chakraborty |
| 2017/0094058 | A1 | 3/2017 | Piaggio |
| 2017/0351962 | A1 | 12/2017 | Appel |
| 2019/0052584 | A1 | 2/2019 | Barve |
| 2019/0228105 | A1* | 7/2019 | Ma .................... G06N 20/00 |
| 2020/0097980 | A1* | 3/2020 | Teo ................ H04M 3/42144 |
| 2021/0097110 | A1 | 4/2021 | Asthana |
| 2021/0193124 | A1* | 6/2021 | Razin .................... G06F 40/30 |
| 2021/0374520 | A1* | 12/2021 | Zhang .................... G06N 20/20 |
| 2022/0019935 | A1* | 1/2022 | Ghatage ............ G06F 11/3065 |
| 2022/0130398 | A1* | 4/2022 | Coman .................... G10L 17/22 |

OTHER PUBLICATIONS

"Bots To Human-Hand Off", Bot Core by Acuvate, Accessed on Apr. 8, 2021, 8 pgs., © 2021 Acuvate, <https://botcore.ai/bot-to-human-handoff/>.

Flow et al., "Chatbot Handoff—How to nail the bot to human handoff", Accessed on Apr. 8, 2021, 7 Pages, <https://flow.ai/blog/kb-chatbot-handoff-how-to-nail-the-bot-to-human-handoff>.

Bhashkar, Build your own Chat bot (text Pre-processsing), Medium. com, Jan. 13, 2019, 72 pgs.

IBM Appendix P, "List of patent and patent applications treated as related", Filed Herewith, 2 pages.

Kapociute-Dzikiene, "A Domain-Specific Generative Chatbot Trained from Little Data", Applied Sciences, Mar. 2020, 19 pgs., doi:10.3390/app10072221, Lithuania.

Lin, et al., "A post-processing method for detecting unknown intent of dialogue system via pre-trained deep neural network classifier", Knowledge-Based Systems, Aug. 2019, 18 pgs., DOI: 10.1016/j.knosys.2019.104979, Beijing, CN, <https://www.researchgate.net/publication/335355868>.

Mamgain, "Chatbot Human Handoff: Seamless Human takeover", Kommunicate, Feb. 11, 2019, 14 pgs.

Meduri, et al., "Recurrent Neural Networks for Dynamic User Intent Prediction in Human-Database Interaction", International Conference on Extending Database Technology (EDBT), Mar. 2019, 4 pgs, © 2019 Copyright held by the owner/author(s).

Mell et al., "The NIST Definition of Cloud Computing", National Institute of Standards and Technology, U.S. Department of Commerce, NIST Special Publication 800-145, Sep. 2011, 7 pages.

Senese, et al., "MTSI-BERT: A Session-aware Knowledge-based Conversational Agent", Proceedings of The 12th Language Resources and Evaluation Conference, May 2020, 9 pgs., © European Language Resources Association (ELRA), licensed under CC-BY-NC.

U.S. Appl. No. 16/586,801, filed Sep. 27, 2019.

Yan, et al., "Unknown Intent Detection Using Gaussian Mixture Model with an Application to Zero-Shot Intent Classification", Proceedings of the 58th Annual Meeting of the Association for Computational Linguistics, Jul. 2020, 11 pgs., © 2020 Association for Computational Linguistics.

Yang, et al., "Neural Matching Models for Question Retrieval and Next Question Prediction in Conversation", SIGIR 2017 Workshop on Neural Information Retrieval, arXiv:1707.05409v1 [cs.IR] Jul. 17, 2017, 7 pgs., © 2017 Copyright held by the owner/author(s).

Ricciardelli et al., "Self-improving Chatbots based on Reinforcement Learning", 4th Multidisciplinary Conference on Reinforcement Learning and Decision Making, May 2019, 6 Pages.

Shrivastava, "Chatbot to Human Handoff: Best Practices for Human Takeover in a Hybrid Solution", Chatbots Life, Medium, Feb. 3, 2020, 18 Pages, <https://chatbotslife.com/chatbot-to-human-handoff-best-practices-for-human-takeover-in-a-hybrid-solution-7cf1c3e396ec>.

\* cited by examiner

QUESTION GENERATION BY INTENT PREDICTION

FIELD OF THE INVENTION

The disclosure relates generally to the generation of question using a predicted intent. The disclosure relates particularly to machine learning-based generation of automated conversation questions using a predicted user-intent.

BACKGROUND

Automated conversation systems exist which follow decision trees in generating a machine—human chatbot conversation. Such systems follow a decision driven menu in selecting response to user inputs. These systems may analyze user input to determine a user's intent and to respond using prepared decision tree responses.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable generating questions according to a prediction of a user's next intent.

Aspects of the invention disclose methods, systems and computer readable media associated with generating questions by receiving user utterance data, determining an intent confidence vector for the user utterance data, predicting, by a trained next user-intent prediction model, a next user-intent confidence vector using the intent confidence vector, and generating a next question using the next user-intent confidence vector.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
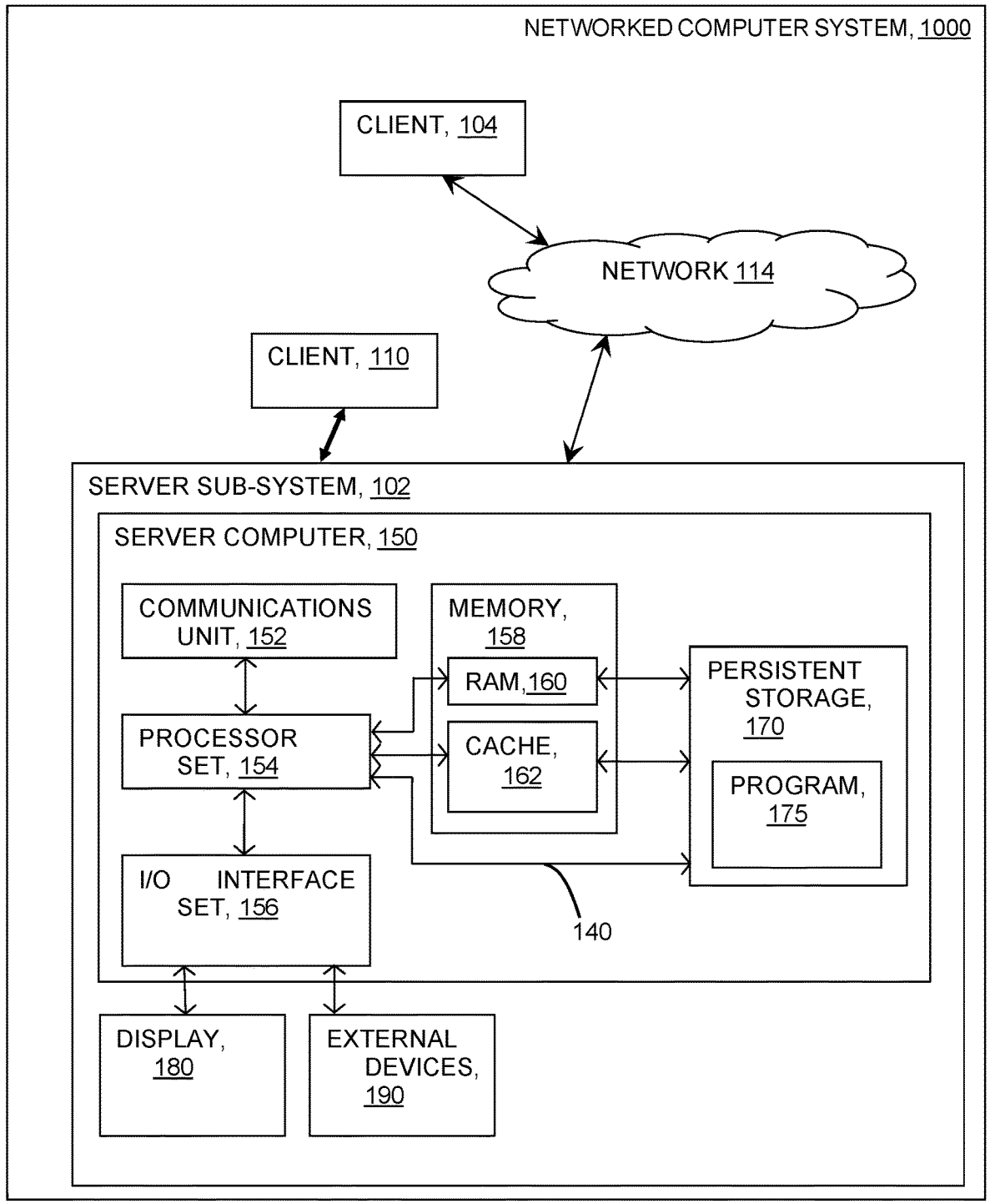
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Chatbots using pre-defined decision trees engage in conversations with users. Such chatbots determine intents from user input and provide a response according to the decision tree. Users seeking information or guidance relating to selecting goods and services typically engage with a human operator. The human operator may have a dynamic conversation with the user to ask personalized questions about the user's needs and to provide guidance on the goods and/or service most able to meet the user's needs. Such customized sales related conversations include opportunities for the human operator to help move the user along a path toward closing a sale of the goods and/or services. Attempts to translate this level of customization to a decision tree may result in a cumbersome tree which still leaves the user feeling as though they are participating in a choose-your-own-adventure experience. Disclosed embodiments enable more dynamic user-chatbot conversation turns through conversation intent matrices utilized to predict a next user-intent from the previous turns of the conversation and from historic data.

Aspects of the present invention relate generally to question answering systems and, more particularly, to generating questions according to a prediction of a user's next intent, or a prediction of what the user is trying to learn. In embodiments, a question answering (QA) system receives a question from a user device and determines a user-intent and associated confidence vector for the user-intent. A next user-intent prediction model provides a next user-intent confidence vector according to the user-intent confidence vector. The next user-intent confidence vector serves as an input to a decision tree leading to the generation of a next chatbot conversation turn based upon the predicted next user-intent.

In accordance with aspects of the invention there is a method for automatically training a next user-intent confidence vector prediction model. Disclosed embodiments separate historic chatbot conversation turns, including labeled user-intents and intent confidence vectors for each conversation turn, into training and validation data sets. Disclosed methods train a machine learning intent classification model to predict a next user intent using a conversation intent matrix, formed from the training data. Successful validation of the machine learning model using the validation data set, leads to provisioning the trained model for use generating chatbot questions according to a prediction of the next user-intent of a current conversation.

Aspects of the invention provide an improvement in the technical field of QA systems. Conventional QA systems utilize decision trees and predictions of a current user-intent extracted from user input. In many cases, the use of the current intent leads to a self-selected conversation path, limited in scope to the user's current knowledge of possibilities. Disclosed embodiments utilize a model trained with historic human operator chatbot data to determine a next user-intent in addition to the current user-intent. This enables the chatbot to lead the conversation along historic conversation lines to successful outcomes for the user, similar to those achieved with a human operator.

Aspects of the invention also provide an improvement to computer functionality. In particular, implementations of the invention are directed to a specific improvement to the way QA systems operate, embodied in the use of historic chatbot conversation data, including human operator-user interaction conversation data, to train model to predict one or more next user-intents and a confidence vector for the next user-intents. This enables the chatbot of disclosed embodiments to lead the user along historically successful conversation lines rather than being limited to the user's understanding of what paths the conversation may take.

As an overview, a QA system is an artificial intelligence application executed on data processing hardware that answers questions pertaining to a given subject-matter domain presented in natural language or engages in conversation turns with a user. The QA system receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, or subject matter area (e.g., financial domain, medical domain, legal domain, etc.) where the body of knowledge (knowledgebase) can be organized in a variety of configurations, such as but not limited to a structured repository of domain-specific information, such as ontologies, or unstructured data related to the domain, or a collection of natural language documents about the domain.

In an embodiment, one or more components of the system can employ hardware and/or software to solve problems that are highly technical in nature (e.g., processing user utterance data, including speech to text translations, determining a user-intent from the processed utterance data, predicting a next user-intent confidence vector from the determined user-intent, generating a next question using the next user-intent confidence vector, etc.). These solutions are not abstract and cannot be performed as a set of mental acts by a human due to the processing capabilities needed to facilitate automated chatbot conversation turns, for example. Further, some of the processes performed may be performed by a specialized computer for carrying out defined tasks related to automated conversation systems. For example, a specialized computer can be employed to carry out tasks related to generating questions for an automated conversation system or the like.

In an embodiment, a method configures, trains, or updates, a question selector engine by manually identifying or preparing questions to suggest to the chatbot user that the user may wish to ask. Such training may include referring to historic chat conversations for a transaction like the type of transaction for which the chatbot application is deployed, and by identifying the intent (from the received user utterance) that underlies each question. This may be done manually or by using the trained intent classifier. Then the method stores the questions for suggestion and the associated intents in a database configured in such a way that the suggested questions can be looked up based on intent, or in a decision tree configured for use by the chatbot.

In an embodiment, for the chatbot application in a live chat conversation, a trained intent classifier, classifies and outputs at least one underlying intent and intent confidence vector for a live question received by the chatbot application. A trained next user-intent predictor model, generates and outputs a set of predicted next user-intents for the received question and also generates and outputs a confidence vector including the associated likelihood of occurrence for each one of the predicted next user-intents in the set. The question selection engine looks up questions for suggestion in the database, or using a decision tree, based on the set of predicted next user-intents and outputs them to the user via a user interface. The chatbot application then receives a next question, remark or request from the user, which may be one of the questions suggested to the user by application, and the process repeats.

In an embodiment, the question generation method receives user utterance data. The utterance data may be digitized audio data from user audio captured using a microphone and a digital to analog conversion system. The method processes the utterance data suing speech to text algorithms to generate a text transcription of the user utterance. The method passes the text transcription to a natural language processing (NLP) algorithm, such as a trained intent classifier for intent classification.

In this embodiment, the intent classifier returns a user-intent for the user utterance data Exemplary intent classifications include, Product Benefits, Use Case, Base Features, Features Analytics, Features Infrastructure, Product Differentiation, Features Customize, Features Import/Export, License Code, System Requirements, Large Scale Installations, Version Demo, Version Compare, Version Free Trial, Troubleshooting Tech Support, Buy, Purchase Options, Pricing, and Renewal. The intent classifier output further includes confidence vector containing probabilities associated with each predicted intent classification.

The method passes the classified intent confidence vector for the user utterance to a trained next user-intent model. The next user-intent model predicts a set of next user-intents according to the provided confidence vector and provides an output including a next user-intent confidence vector for the predicted set of next user-intents. The next user-intent confidence vector includes confidence values for each predicted next user-intent from the model.

The method evaluates the next user-intent confidence vector through a question generation engine and provides a set of at least one question to be provided as a response to the user utterance. As the chatbot conversation progresses, the method proceeds through the set of steps outlined above, receiving and processing utterance data to generate next response to current user utterances. With each iteration of the steps the method appends the newest classified user utterance intent confidence vector to all previous classification confidence vectors and passes the entire set of appended confidence vectors to the next user-intent prediction model for processing.

In an embodiment, the method includes training the next user-intent prediction model. In this embodiment, the method receives historic user conversation turn data, including conversation turn data from user interactions with human operators. In this embodiment, the method processes the historic conversation data using the trained intent classifier, yielding a data set including intents and confidence vectors for each conversation turn.

The method dividers the overall historic conversation data set into a training data set and a validation data set. Each data set includes a fixed percentage of the overall data set, such as 80% training data, 20% validation data, 90% training data, 10% validation data, etc.

In an embodiment, the method generates a confidence vector matrix using the set of confidence vectors of the training data. In this embodiment, the generated matrix has dimensions of maximum transcript length×number of intents. Maximum transcript length corresponds to maximum number of conversation turns (N) found in a single conversation within the historic training data conversation transcriptions. Number of intents corresponds to the total number of possible intents defined for the next user-intent prediction model. For any training data set conversations having a number of conversation turns (n), fewer than the maximum conversation length number of conversation turns N, the method concatenates a zero matrix of (N−n−1)× Number of intents to the conversation turn data yielding an input matrix of size N×number of intents.

In an embodiment, the method utilizes a fully connected neural network, with one fully connected hidden layer having a size equal to the number of intents, to generate an output vector having a size equal to the number of intents from an input matrix of conversation turn data. In an embodiment, the method receives a tensor sized K×Maximum transcript length×number of intents as an input for a plurality or batch of K conversations to be processed concurrently. In this embodiment, the method concatenates appropriately sized zero matrices to each conversation to yield appropriately sized input matrices as elements of the tensor. The method validates the trained model using the validation data set. The method processes input matrices from the validation data set and compares the model predictions for the input matrix to the labeled intents of the matrices. The method continues training the next user-intent prediction model until achieving a satisfactory level of validation evaluation accuracy, such as a validation accuracy of about 85%. In an embodiment, the method continuously retrains the model using the new labeled conversation data. In an embodiment, the method reduces the likelihood of overfitting the next user-intent prediction model to the training data by selectively dropping the confidence vector for each user utterance from each conversation of the training data set according to a randomized factor compared to a probability threshold for the factor. For example, a threshold factor epsilon, has a value of 0.2. The randomized value of a user utterance for a conversation equals 0.18, resulting in the utterance being dropped out of the conversation for the relevant iteration of the model training activity.

In an embodiment, the method trains a long-short-term memory (LSTM) model to predict next user-intents from current user utterance intent classifications. In this embodiment, the method trains and validates the LSTM model using the historic conversation data described above. As noted above, the intent classifier processes the historic data yielding intent classifications and intent confidence vectors for each historic conversation turn. The method utilizes 1×number of intents input vectors and the model yields a 1×number of intents output vector. In this embodiment, the method utilizes L1 regularization, least absolute shrinkage and selection operator (Lasso), applied to the input and output gate weight matrices. The method determines the penalty weight for the regularization through standard hyperparameter tuning. In an embodiment, the method utilizes the highest confidence element of the output vector as input to the question generation engine.

In an embodiment, the method continuously retrains the next user-intent prediction model using the original training data set augmented with labeled conversation data acquired through use of the trained model. After initial training, the method uses the trained model to generate responses to user utterances as part of one or more chatbot conversations. These conversations are transcribed and added the training data set together with the associated conversation turn intents and confidence vectors from the intent classifier.

In an embodiment, the method presents the trained model with new user utterance data from one or more conversations. In this embodiment, the method processes the user utterance data and provides a next user-intent confidence vector for each received user utterance from each monitored conversation. The method evaluates the next user utterance intent confidence vector for each utterance of each conversation and generates a response to the user according to the evaluation.

In an embodiment, the question generator includes an intent-to-question mapper configured to generate suggested questions that the application predicts the user may wish to ask next and, significantly, that the application also determines may be productive, as further explained herein. The mapper generates suggested next questions in response to receiving a set of predicted next user-intentions from a re-ranker, which the mapper does, in one embodiment, by selecting and presenting questions from a pre-built database that maps predicted next user-intentions to corresponding next questions that have been manually prepared and stored in database prior to operating the application in live conversation mode.

In order to limit the output of intent-to-question mapper to next question suggestions that are most productive, the re-ranker evaluates received predicted next user-intents and selects a subset of predicted next user-intents that the re-ranker receives from next user-intent predictor, and outputs the subset to the mapper. In an embodiment, evaluation of the next user-intent confidence vector by the re-ranker includes adjusting the relative confidence values of the confidence vector. In this embodiment, the re-ranker adjusts individual response element's confidence values according to a productive value ranking algorithm. The productive value ranking algorithm may provide a ranking indicative of the measure of business value for each predefined type of predicted next user-intent that the re-ranker receives. The re-ranker orders the predicted next user-intents according to the productive value ranking algorithm ranking for each predicted intent. The re-ranker then yields the highest ranked or valued intent from among the set of predicted next user-intents as an output. By outputting only the highest valued subset of predicted next user-intents to the question generation engine, the re-ranker ensures that the question generation engine, in turn, only generates suggested next questions that have the highest business value.

In an embodiment of the present invention, the productive value ranking algorithm of the re-ranker provides a measure of business value for each predefined type of predicted next user-intent that the re-ranker receives, as described herein, and the re-ranker outputs only the three highest ranked intents of predicted next user-intents for each transaction in conversation.

With regard to the aforementioned "transaction" in a conversation, each question from the user received by the intent classifier may be deemed a transaction in this context. For each question, the intent classifier generates a corresponding intent and intent confidence vector. In turn, the trained next user-intent predictor generates and outputs a list of predicted next user-intents and an associated next user-intent confidence vector. This causes the re-ranker to select and output a highest valued subset of the predicted next intents, such as the top three for example. In turn, the intent-to-question mapper outputs three suggested next questions to the user. When the user selects one of the suggested next questions, or enters a different question, remark or request, the question generating program begins a new transaction and the transaction cycle repeats.

The ranking algorithm of the re-ranker assigns each intent of the predicted next user-intent confidence vector a score that indicates how valuable the intent is to an enterprise for which the chatbot application is deployed. The algorithm includes a transformation function and a scoring function. The transformation function transforms the received next user-intent confidence vector using the scoring function. The re-ranker then outputs top ranked intents of confidence vector. In one embodiment of the re-ranker, which may be referred to as a "buyer stage journey" embodiment, these scores are predetermined manually and correlate with a buyer stage in a buyer stage journey, where respective buyer stages are predefined and mapped manually to one or more of the intents that classifier is predefined to recognize.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise question generation program (not shown) together with sufficient computing resource (processor, memory, network communications hardware) to execute the program. Client device 104 and 110 may function as user access points for using the disclosed systems and methods, as well as administrative monitoring points associated with the disclosed embodiments. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the question generation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., question generation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
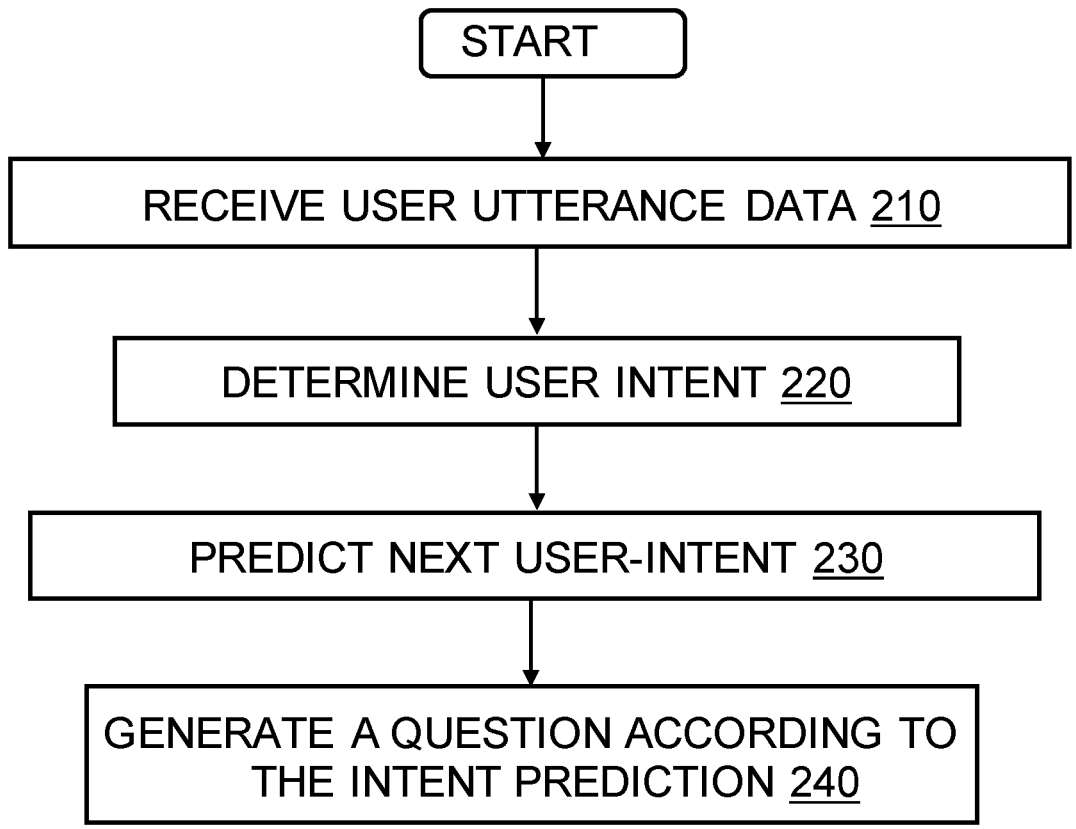
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of question generating program 175 executing on a processor of a device of FIG. 1, receives user utterance data. The user utterance data may be an audio file or an output of a speech to text converter associated with the user utterance. In an embodiment, the user utterance serves as input to an automated chatbot or question answering system provided as a substitute for, or in addition to, interaction with a human operator.

At block 220, the method of question generating program 175 determines an intent associated with the user utterance data. An intent classifier uses natural language processing or a similar algorithm to classify a user-intent through analysis of the words and sentence structure of the speech to text transcription of the user utterance. The intent classifier returns a set of possible intents as well as a confidence vector providing the probability or confidence associated with each of the intent classifications. As an example, the intent classifier may provide one or more predicted intent classifications for the user utterance data from among a set of defined possible intents available to the classifier. The confidence vector includes the probability associated with each predicted intent. In an embodiment, the confidence vector includes a probability value for each defined intent of the intent classifier. In this embodiment, each confidence vector has the size 1×number of intent classifications.

At block 230, the method predicts a next user-intent using the intent confidence vector from the intent classifier as an input to a previously trained next user-intent prediction model. Training the next user-intent prediction model includes the use of historic user conversations including conversations with human operators and with an automated chatbot system. In an embodiment, the intent classifier processes the historic conversation data and provides intent predictions and a confidence vector for the conversation turns of the historic data. The method generates a matrix from the sequences of confidence vectors associated with each historic conversation. The method trains a machine learning model such as neural network or an LSTM model to predict a next user intent from a current sequence of user-intents utilizing the conversation matrix of intent confidence vectors. The next user-intent prediction model provides an output including a confidence vector for the predicted next user-intent.

At block 240, the method passes the predicted next user-intent confidence vector to a question generation engine which matches the highest ranked next user-intent prediction using a database of manually prepared intent—question parings. In an embodiment, the method utilizes a defined conversation decision tree to select a predefined question at a decision node associated with the next user-intent having the highest predicted probability. In an embodiment, the method passes the predicted next user-intent confidence vector to a re-ranker. In this embodiment, the re-ranker adjusts the relative confidence rankings of the predicted next user-intent according to a productive value ranking algorithm. The productive value ranking algorithm ranks predicted next user-intents according to the relative business value of each possible user-intent.

Figure 3:
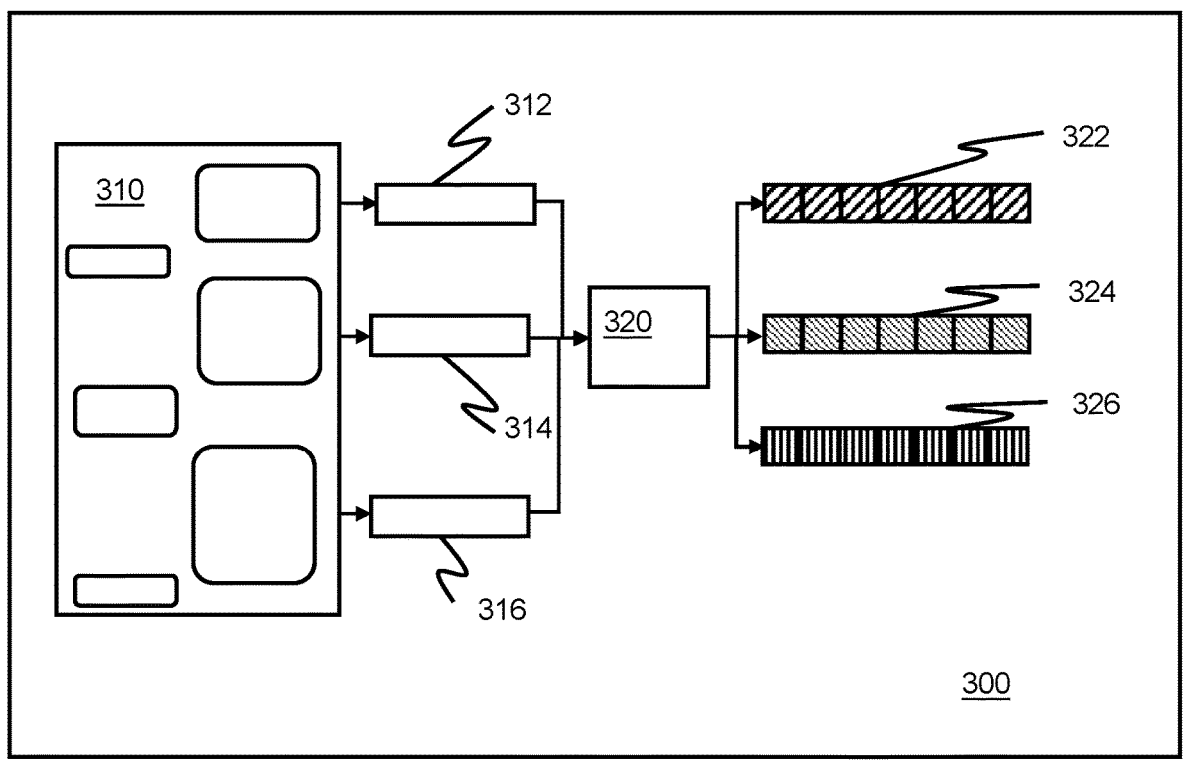
FIG. 3 depicts confidence vector extraction, according to an embodiment of the invention.

FIG. 3 provides an illustration 300, of the generation of intent confidence vectors from received user utterance data. As shown in the Figure, conversation data 310, includes user utterances 312, 314, and 316. The method passes each user utterance to a trained intent classifier 320. Intent classifier 320 generates an intent confidence vector 322, 324, and 326, for each input user utterance. The intent confidence vectors have the size 1×N, where N is the number of user-intents defined for the classifier.

Figure 4:
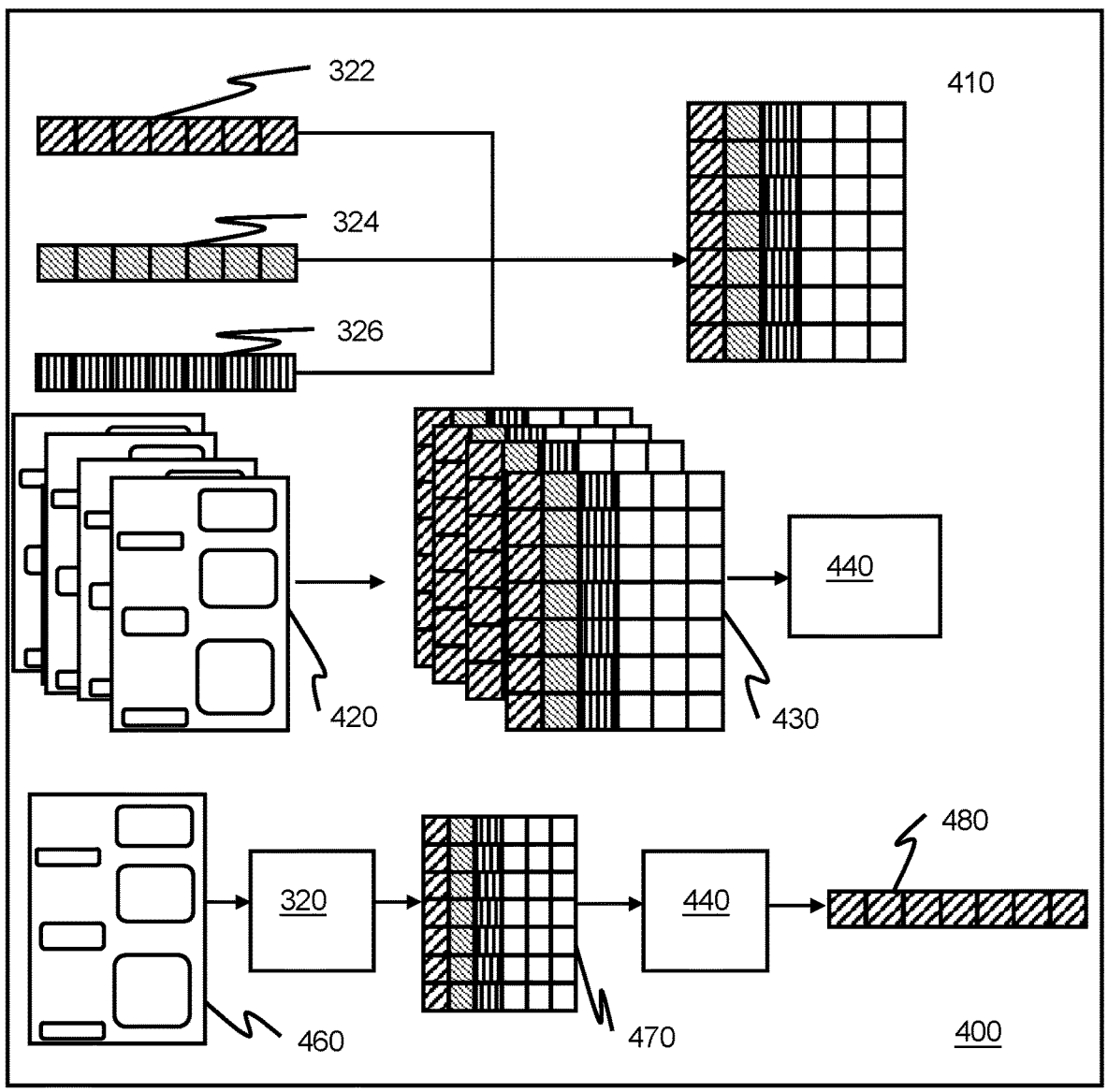
FIG. 4 depicts conversation intent confidence matrix generation, according to an embodiment of the invention.

FIG. 4 provides a schematic illustration 400, of the generation of a conversation matrix from historic conversation data and the use of the conversation matrix in predicting a next user-intent. As shown in the Figure, the intent confidence vectors 322, 324, and 326, of FIG. 3, are assembled into a conversation intent confidence matrix 410, for the conversation 310 of FIG. 3. Conversation intent confidence matrices 410 from multiple historic conversations 420, are combined to form a single next user-intent prediction matrix 430, used to train the next user-intent predictor 440. Next user-intent prediction matrix 430, serves as training data for a machine learning model 440, such as neural network or an LSTM model. During training, the weights of the network nodes of the respective models are adjusted such that the loss function of the model is minimized and the model accurately classifies the next user-intent from a single current user-intent or from a sequence of user-intents. In an embodiment, during training the method randomly drops out user-intents from conversations of the training data of the conversation intent confidence matrix to prevent overfitting.

In operation, trained intent classifier model 320, receives user utterance data from one or more contemporaneous user-chatbot interactions 460. Intent classifier 320 outputs a confidence vector for each of the received user utterances. In an embodiment, the method passes a conversation intent confidence matrix 470, generated from the confidence vectors, to the next user-intent prediction engine 440 and receives a prediction of next user-intent confidence vector 480. In an embodiment, the method passes sequences of confidence vectors from a conversation 460, to the next user-intent prediction model and receives a predicted next user-intent confidence vector 480 for each passed sequence. In this embodiment, the output next user-intent confidence vector 480 passes to the defined question generation engine for matching using intent question parings or passes to a defined decision tree to generate the next question/response to the user.

Figure 5:
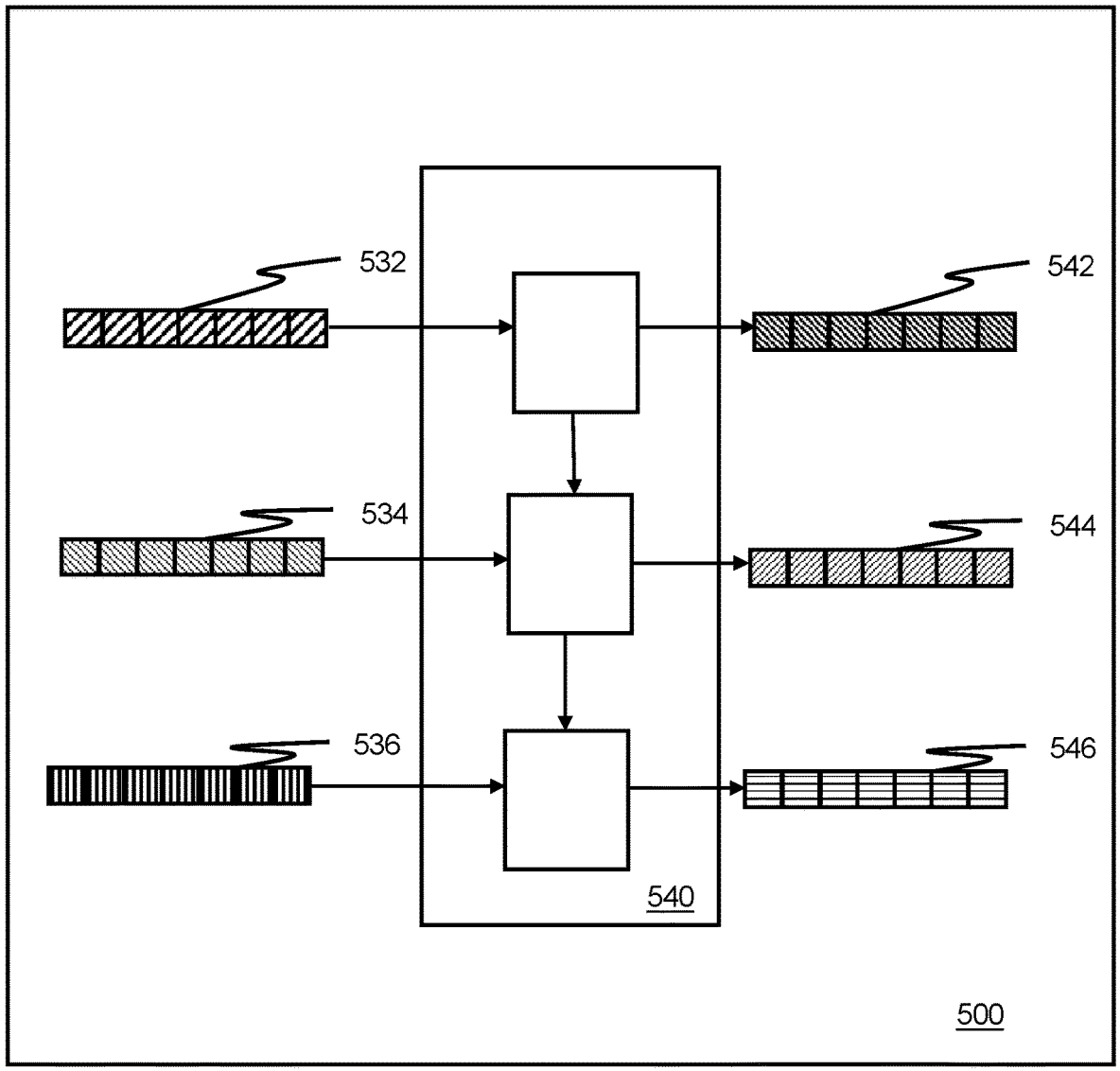
FIG. 5 depicts intent prediction training, according to an embodiment of the invention.

FIG. 5 provides a schematic illustration 500, which illustrates training an LSTM for use as the next user-intent prediction engine. In an embodiment, the LSTM model training includes the use of L1 regularization to prevent overfitting the LSTM model to the training data. As shone in the Figure, conversation data includes a series of user utterances. In an embodiment, the method passes user utterances to intent classifier 320 from FIG. 3. Intent classifier 320 outputs a confidence vector for each of received user utterances. Confidence vectors 532, 534, and 536, are passed to trained LSTM model 540 which outputs a predicted next user-intent confidence vector 542, 544, 546, for each received intent confidence vector. In this embodiment, the output next user-intent confidence vector passes to the defined question generation engine for matching using intent question parings or passes to a defined decision tree to generate the next question/response to the user.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
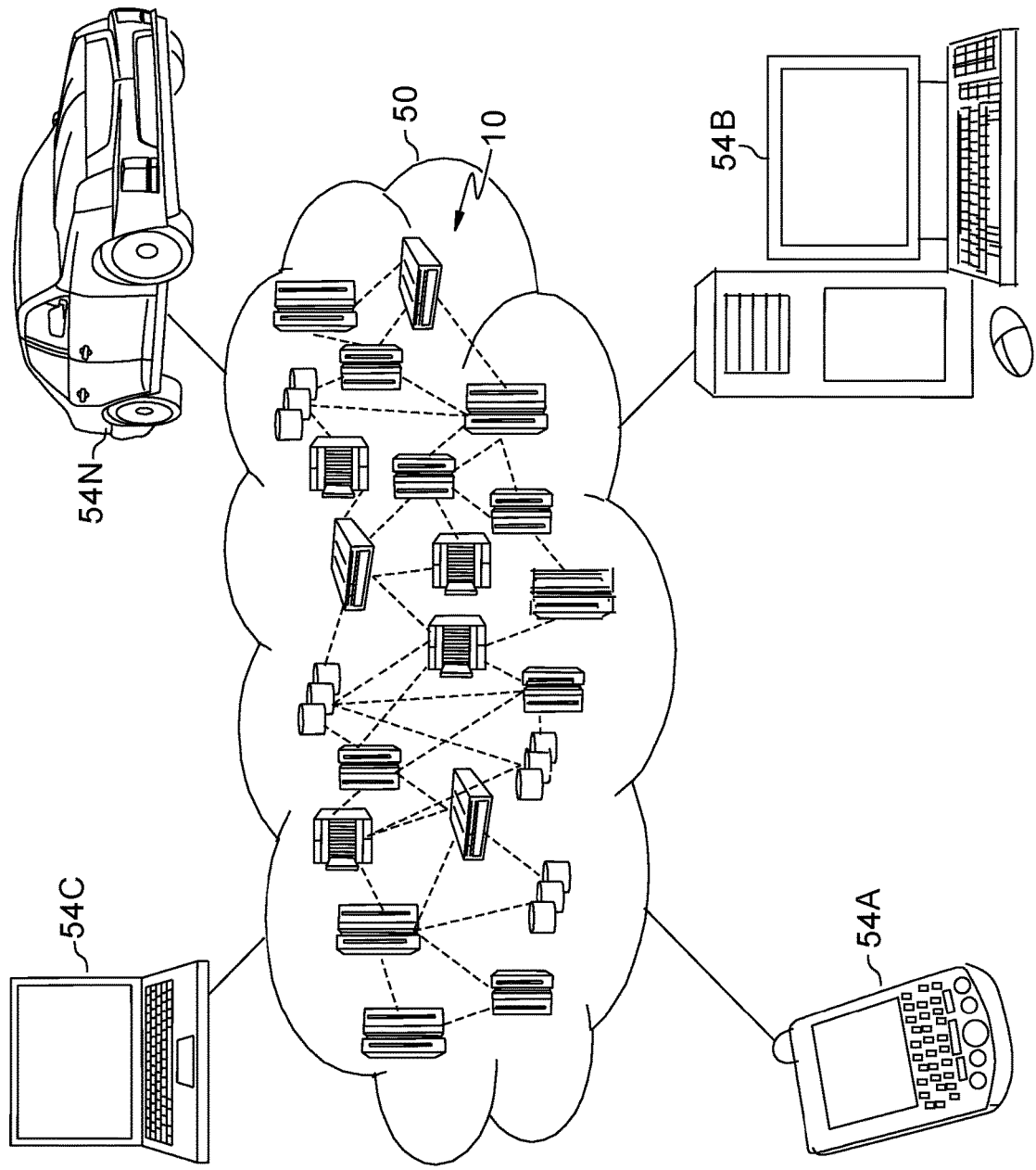
FIG. 6 depicts a cloud computing environment, according to an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
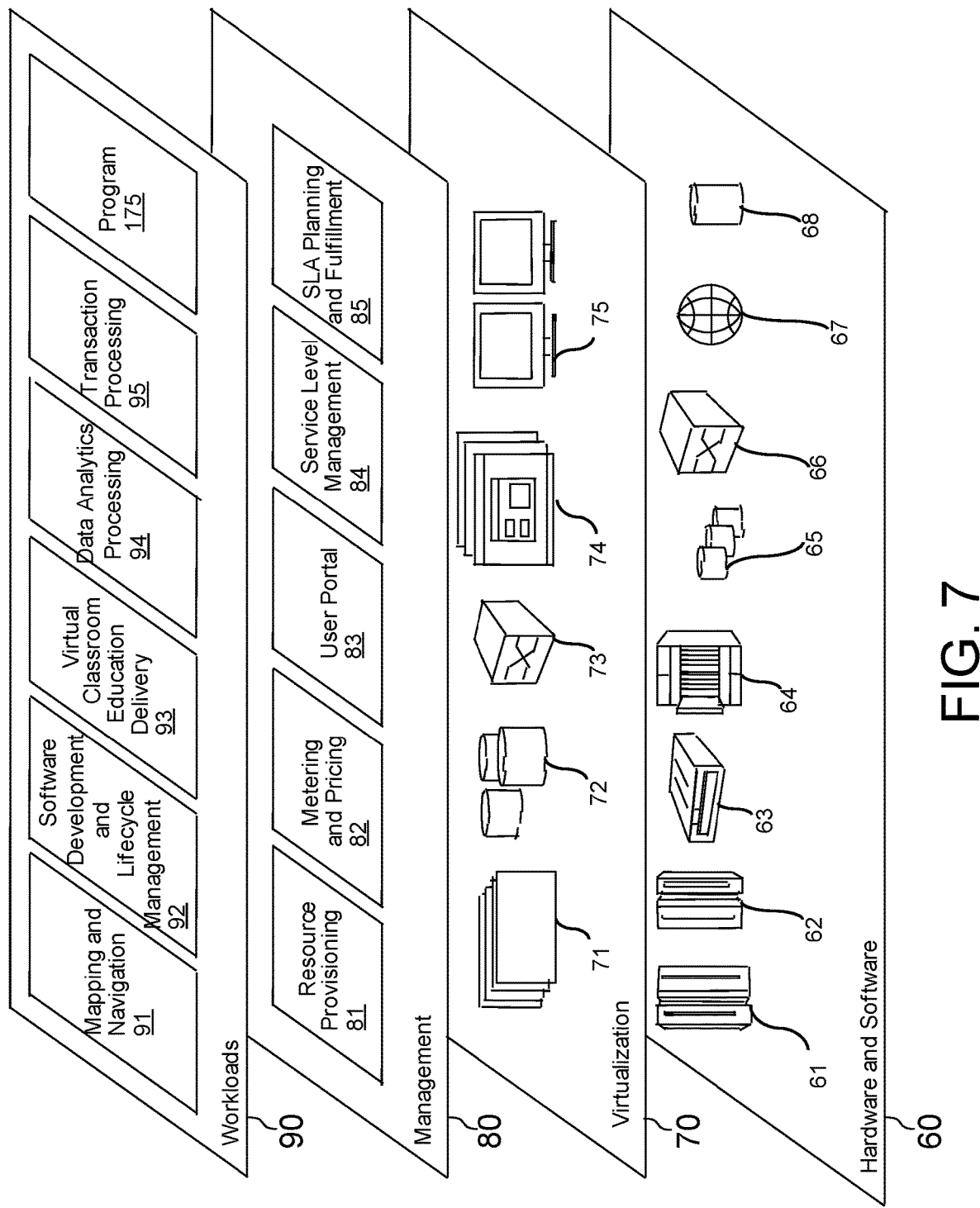
FIG. 7 depicts abstraction model layers, according to an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and question generation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for question generation, the computer system comprising:
   one or more computer processors;
   one or more computer readable storage devices; and
   stored program instructions on the one or more computer readable storage devices for execution by the one or more computer processors, the stored program instructions comprising:
     program instructions to receive user utterance data;
     program instructions to determine an intent confidence vector for the user utterance data;
     program instructions to train the next user-intent prediction model comprising:
       program instructions to receive historic chatbot conversation data, wherein the chatbot conversation data comprises labeled user-intents and intent confidence vectors for each user utterance of each conversation;
       program instructions to separate the chatbot conversation data into training data and validation data;
       program instructions to generate a matrix including all the intent confidence vectors for all historic conversation training data;
       program instructions to train a machine learning model to classify user-intents using the matrix of training data;
       program instructions to drop out at least one intent confidence vector during training;
       program instructions to validate the machine learning model using the validation data; and
       program instructions to provide a trained next intent predictor mode for use in generating questions:
     program instructions to predict, by the trained next user-intent prediction model, a next user-intent confidence vector using the intent confidence vector;
     program instructions to generate a next question set using the next user-intent confidence vector;
     program instructions to adjust a confidence value of the next user-intent confidence vector according to value ranking for a predefined type of a next user intent provided by a productive value ranking algorithm;
     program instructions to generate an ordered version of the next question set ordered according to next user intent confidence vector values adjusted according to the productive value ranking algorithm; and
     program instructions to output a subset of the ordered version having a highest value to the user.

2. The computer system according to claim 1, the stored program instructions further comprising:
   program instructions to predict a next user-intent confidence vector using a sequence of intent confidence vectors determined from a sequence of received user utterance data.

3. The computer system according to claim 1, the stored program instructions further comprising program instructions to train a long short term memory (LSTM) neural network with L1 regularization, as the next user-intent prediction model, and program instructions to provide the trained LSTM neural network or use predicting a next user-intent.

4. The computer system according to claim 3, the stored program instructions further comprising program instructions to train the LSTM neural network using a least absolute shrinkage and selection operator for regularization.

5. A computer program product for question generation, the computer program product comprising one or more computer readable storage devices and collectively stored program instructions on the one or more computer readable storage devices, the stored program instructions comprising:
   program instructions to receive user utterance data;
   program instructions to determine an intent confidence vector for the user utterance data;
   program instructions to train the next user-intent prediction model comprising:
     program instructions to receive historic chatbot conversation data, wherein the chatbot conversation data comprises labeled user-intents and intent confidence vectors for each user utterance of each conversation;
     program instructions to separate the chatbot conversation data into training data and validation data;
     program instructions to generate a matrix including all the intent confidence vectors for all historic conversation training data;
     program instructions to train a machine learning model to classify user-intents using the matrix of training data;
     program instructions to drop out at least one intent confidence vector during training;
     program instructions to validate the machine learning model using the validation data; and
     program instructions to provide a trained next intent predictor mode for use in generating questions:
   program instructions to predict, by the trained next user-intent prediction model, a next user-intent confidence vector using the intent confidence vector;
   program instructions to generate a next question set using the next user-intent confidence vector;
   program instructions to adjust a confidence value of the next user-intent confidence vector according to value ranking for a predefined type of a next user intent provided by a productive value ranking algorithm;
   program instructions to generate an ordered version of the next question set ordered according to next user intent confidence vector values adjusted according to the productive value ranking algorithm; and program instructions to output a subset of the ordered version having a highest value to the user.

6. The computer program product according to claim 5, the stored program instructions further comprising:
program instructions to predict a next user-intent confidence vector using a sequence of intent confidence vectors determined from a sequence of received user utterance data.

7. The computer program product according to claim 5, the stored program instructions further comprising program instructions to train a long short term memory (LSTM) neural network with L1 regularization, as the next user-intent prediction model, and program instructions to provide the trained LSTM neural network or use predicting a next user-intent.

8. The computer program product according to claim 7, the stored program instructions further comprising program instructions to train the LSTM neural network using a least absolute shrinkage and selection operator for regularization.

9. The computer program product according to claim 5, wherein
program instructions to receive user utterance data comprises receiving data from a plurality of conversations.

10. A computer implemented method for generating questions, the method comprising:
receiving, by one or more computer processors, user utterance data;
determining, by the one or more computer processors, an intent confidence vector for the user utterance data;
training, by the one or more computer processors, the next user-intent prediction model by:
receiving, by the one or more computer processors, historic chatbot conversation data, wherein the chatbot conversation data comprises labeled user-intents and intent confidence vectors for each user utterance of each conversation;
separating, by the one or more computer processors, the chatbot conversation data into training data and validation data;
generating, by the one or more computer processors, a matrix including all the intent confidence vectors for all historic conversation training data;
training, by the one or more computer processors, a machine learning model to classify user-intents using the matrix of training data;
dropping out, by the one or more computer processors, at least one intent confidence vector during training:
validating, by the one or more computer processors, the trained machine learning model using the validation data; and
providing, by the one or more computer processors, a trained next intent predictor mode for use in generating questions:
predicting, by the one or more computer processors through the trained next user-intent prediction model, a next user-intent confidence vector using the intent confidence vector;
generating, by the one or more computer processors, a next question set using the next user-intent confidence vector;
adjusting, by the one or more processors, a confidence value of the next user-intent confidence vector according to value ranking for a predefined type of a next user intent provided by a productive value ranking algorithm;
generating, by the one or more processors, an ordered version of the next question set ordered according to next user intent confidence vector values adjusted according to the productive value ranking algorithm; and
outputting, by the one or more processors, a subset of the ordered version having a highest value to the user.

11. The computer implemented method according to claim 10, further comprising:
predicting, by the one or more computer processors, a next user-intent confidence vector using a sequence of intent confidence vectors determined from a sequence of received user utterance data.

12. The computer implemented method according to claim 10, further comprising training, by the one or more computer processors, a long short term memory (LSTM) neural network with L1 regularization, as the next user-intent prediction model, and providing the trained LSTM neural network or use predicting a next user-intent.

13. The computer implemented method of claim 12, further comprising training, by the one or more computer processors, the LSTM neural network using a least absolute shrinkage and selection operator for regularization.

14. The computer implemented method according to claim 10, wherein
receiving user utterance data comprises receiving data from a plurality of conversations.

* * * * *